United States Patent [19]
Anno

[11] Patent Number: 5,476,744
[45] Date of Patent: Dec. 19, 1995

[54] TONER FOR DEVELOPING ELECTROSTATIC LATENT IMAGES

[75] Inventor: Masahiro Anno, Osaka, Japan

[73] Assignee: Minolta Camera Kabushiki Kaisha, Osaka, Japan

[21] Appl. No.: 261,221

[22] Filed: Jun. 15, 1994

Related U.S. Application Data

[62] Division of Ser. No. 974,220, Nov. 10, 1992, abandoned.

[30] Foreign Application Priority Data

Nov. 11, 1991 [JP] Japan ................ 3-294185

[51] Int. Cl.⁶ .......................... G03G 9/08; B01D 12/00; B01D 24/00
[52] U.S. Cl. .................... 430/137; 430/111; 523/310; 523/339
[58] Field of Search ............. 430/110, 14, 137; 523/339, 310

[56] References Cited

U.S. PATENT DOCUMENTS

| | | | |
|---|---|---|---|
| 3,674,736 | 7/1972 | Lerman et al. | 430/137 |
| 3,847,886 | 11/1974 | Blunt | 430/137 |
| 4,599,294 | 7/1986 | Matsumoto et al. | 430/137 |
| 4,802,977 | 2/1989 | Kanda et al. | 430/137 |
| 4,833,060 | 5/1989 | Nair et al. | 430/137 |
| 4,996,126 | 2/1991 | Anno et al. | |
| 5,023,158 | 6/1991 | Tomono et al. | 430/110 |
| 5,139,916 | 8/1992 | Ciccarelli | 430/137 |
| 5,206,109 | 4/1993 | Anno | 430/106.6 |
| 5,219,694 | 6/1993 | Anno et al. | 430/110 |
| 5,290,654 | 3/1994 | Sacripante et al. | 430/111 |
| 5,346,790 | 9/1994 | Sacripante et al. | 430/111 |

FOREIGN PATENT DOCUMENTS 38-2095  3/1963  Japan.

Primary Examiner—Christopher D. Rodee
Attorney, Agent, or Firm—Burns, Doane, Swecker & Mathis

[57] ABSTRACT

A toner for developing electrostatic latent images obtained by passing a toner composition-dispersed phase comprising at least a thermoplastic resin dissolved/dispersed in organic solvents through a microporous body to form an emulsion in an aqueous solution which is to form a continuous phase, and then removing the organic solvents from the emulsion.

14 Claims, 2 Drawing Sheets

TONER FOR DEVELOPING ELECTROSTATIC LATENT IMAGES

This application is a divisional of application Ser. No. 07/974,220, filed Nov. 10, 1992, now abandoned.

BACKGROUND OF THE INVENTION

The present invention relates to toners for developing electrostatic latent images in electrophotography.

In recent years, high enhancement of quality of copy images is desired in the fields of copying machines and printers in the electrophotographic systems. In order to meet the r requirements, the methods for making toner's particle size distribution sharp and for making its particle size small have been investigated. In coping with such needs, the conventional pulverizing method for manufacturing toner has reached a limit technically as well as in productivity aspects including yield, so that a wet pulverizing process has been reconsidered in recent years. The suspension polymerization and suspension granulation methods, being representative of the wet granulation methods, are more advantageous than the pulverizing method in their ability to make particle size small and in the productivity aspects, but involve difficulty in making the particle size distribution sharp. In the suspension polymerization method, the kinds of usable resins are limited. Polyester resins which have been put into frequent use in developers for full colors and high speed systems in recent years can not be manufactured.

SUMMARY OF THE INVENTION

The present invention relates to toners for developing electrostatic latent images, with its object to provide small particle size toners having sharp particle size distributions, which are manufactured by the wet granulation method.

DETAILED DESCRIPTION OF THE INVENTION

The present invention is to provide toners of small particle size which have sharp particle size distributions and which do not scatter nor produce fogs.

The present invention has accomplished the above object by a toner obtained by passing a toner composition-dispersed phase comprising at least a thermoplastic resin dissolved or dispersed in an organic solvent through a microporous body to form a homogeneous emulsion in an aqueous solution which is to form a continuous phase, and then removing the organic solvent from the emulsion.

The toner of the present invention is characterized in that in performing its suspension granulation, a dispersed phase of a toner composition is passed through a microporous body having a uniform pore diameter, to be granulated in an aqueous solution which is to form a continuous phase, followed by drying the granulated particles, obtaining the toner. In this way, a toner having a small particle size and a sharp particle size distribution can be obtained. On this account, when used as a developer, the toner is charged uniformly and toner scattering, fogging and the like do not occur.

Figure 1:
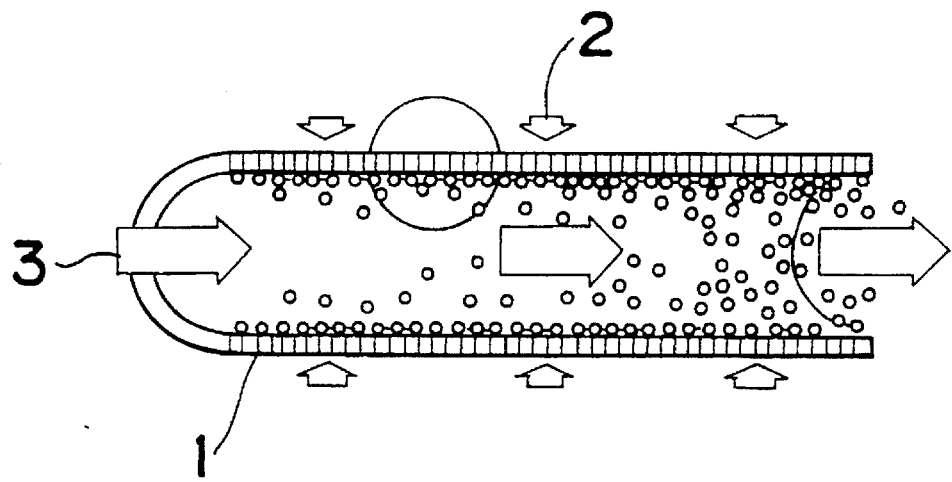
FIG. 1 is a schematic sectional view for explaining the suspension granulation method in use of a microporous body.
Figure 2:
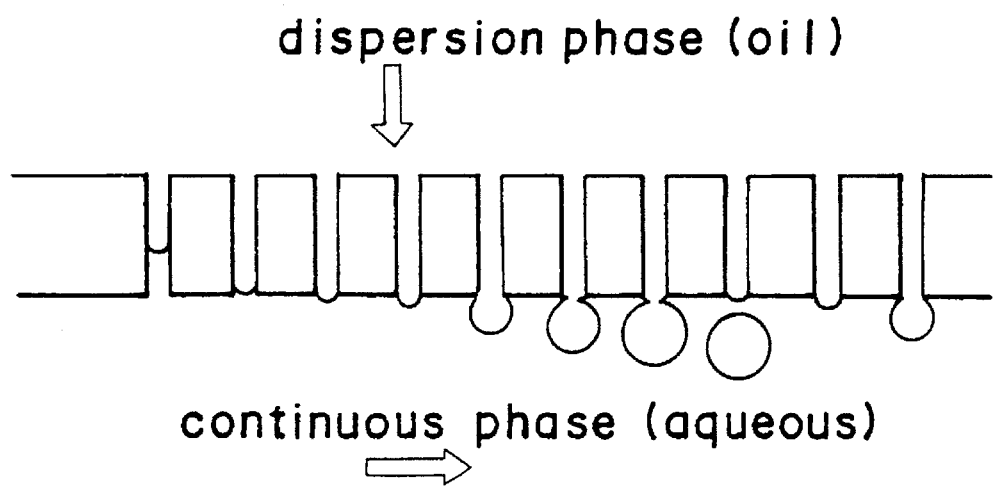
FIG. 2 is a partially enlarged view of a section of the microporous body.

The suspension granulation method using microporous body is schematically represented in FIG. 1. In the figure, the reference number 1 denotes a microporous body, the reference number 2 a flow of a toner composition-dispersed phase (dispersed phase), and the reference number 3 a flow of an aqueous solution phase (continuous phase) thereof. A part of the microporous body (the encircled part in FIG. 1) is depicted in FIG. 2 in an enlarged state.

The toner composition-dispersed phase 2 is pressed into the continuous phase (aqueous solution) 3 through pores of the microporous body, thereby being granulated into oil drops with a uniform small particle size in the continuous phase. Toner particles can be obtained by removing the solvent from the oil particles.

By this suspension granulation method, toner particles formed of polyester resin which can not be granulated by the suspension polymerization method can be manufactured at high efficiency as a small toner having a sharp particle size distribution.

The microporous body to be used in this invention is required to have:

(1) Penetrated pores with a maximal uniformity in the pore diameter distribution;

(2) High mechanical strength enough to resist deformation and breakdown, when the liquid to form the dispersed phase is pressed into the liquid to form the continuous phase;

(3) Chemical durability (chemical inertness) without dissolving into or swelling in the dispersed phase, continuous phase as well as the granulated composition; and (4) Higher wettability to the liquid to form the continuous phase than that to form the dispersed phase.

In particular, if the microporous body does not fully meet the above requirements (1)–(4), it will be difficult to form a dispersion having a uniform particle size. Accordingly, the microporous body should desirably be made hydrophilic by modifying its surface, if necessarily.

The materials which meet the aforementioned requirements to be employed as the porous body are limited to neither inorganic nor organic substances. Such materials may be exemplified by a porous glass of $CaO-B_2O_3-SiO_2-Al_2O_3$ disclosed in Japanese Patent Publication No. Sho 62-25618 and a porous glass of $CaO-B_2O_3-SiO_2-Al_2O_3-Na_2O$ disclosed in Japanese Patent Laid-Open Publication No. Sho 61-40841, which are formed into film-like bodies, and a capillary plate (made by Hamamatsu Photonics K.K.) shown in FIG. 4. With regard to the shape of the pore in the porous body, circular or hexagonal or other various shapes are usable. These porous glasses are preferably used because the pore diameters thereof are readily controllable in a narrow range and the pores are cylindrical in their longitudinal section.

The pore diameter needs to be adequately selected according to the type and particle size of the toner desired. Thus this needs to be individually investigated, comprehensively taking account of dispersed phase, viscosity, granulating conditions and toner particle size, continuous phase and the like.

The thickness of the microporous body should be determined normally to be less than 10 mm, preferably, 0.2–5 mm in particular, taking account of its strength.

The range of variation in the pore diameter of the microporous body is evaluated by the value $\epsilon$. The value $\epsilon$ is the ratio of the pore diameter ($\phi\mathbf{10}$) to the pore diameter ($\phi\mathbf{90}$). The pore diameter ($\phi\mathbf{10}$) is calculated from the value occupying 10% of the whole volume, referring to a relative cumulative pore distribution curve. The pore diameter ($\phi\mathbf{90}$) is calculated from the volume occupying 90% of the whole volume. In the present invention, the value $\epsilon$ should be preferably 1–3, more preferably 1–2. The value of $\epsilon$ approaching 1 implies increasing uniformity of the pore diameter.

It should be noted that the relative cumulative pore distribution curve for the microporous body is normally obtained by means of a mercury pressure-in type porosimeter. The pore distribution curve is derived from integrating this curve.

The toner composition-dispersed phase is formed by dissolving or dispersing at least a thermoplastic resin into an organic solvent. At this stage, toner additives, for example, an offset-preventing agent or a charge controlling agent may be added. In this instance, predetermined amounts of them may be melted and kneaded together with the thermoplastic resin, the resulting resin being thereafter ground for use, or may be added simultaneously when the thermoplastic resin is dissolved or dispersed into the organic solvent.

Usable thermoplastic resins are not particularly restricted, only if they are usually used in toners as binders. For example, such thermoplastic resins as polystyrenic, poly(meth)acrylic, polyolefinic, polyamidic, polycarbonate base, polyetheric, polysulfonic, polyesteric, and epoxy resins are usable. Further, not only thermoplastic resins in perfect polymer state but thermosetting resins containing oligomers, prepolymers or cross-linking agents are also usable.

Recently, the techniques for enabling copying to be done at still higher speed are desired. In the toners for use in such high speed systems, toner's fixability onto transfer paper in short time and its releasability from the fixing roller need to be improved. Accordingly, desirable for the binding resins for use in high speed systems are homopolymers or copolymers synthesized from styrenic, (meth)acrylic, or (meth)acrylate monomers or polyester resins. With regard to their molecular weights, the relationship between the number average molecular weight (Mn) and the weight average molecular weight (Mw) should be $1,000 \leq Mn \leq 15,000$, and $20 \leq Mw/Mn \leq 70$. Further, concerning the number average molecular weight (Mn), those giving $2,000 \leq Mn \leq 10,000$ are preferable. For their use as toners for oilless fixation, those containing 5–20% by weight of gelling components with their glass transition points of 55°–80° C. and softening points of 80°–150° C. are preferable.

As the toner-composing resins, polyester resins are drawing attention from the viewpoint of resistance to vinyl chloride, transmittance as light-transmittable color toners and adherence to OHP sheet.

When such polyester resins are applied to light-transmittable color toners, linear polyesters with their glass transition points of 55°–70° C., softening points of 80°–150° C., number average molecular weights (Mn) of 2,000–15,000 and molecular weight distributions (Mw/Mn) of 3 or less, are desirable.

Linear urethanes of modified polyesters (C) obtained by treating diisocyanate (B) with linear polyester resins (A) may be used. The linear urethanes may be obtained by treating 0.3–0.95 mole of diisocyanate (B) with 1 mole of linear polyester resins so that the resin (C) may have a number average molecular weights of 2,000–15,000, an acid value of not more than 5, and its terminal radicals substantially being hydroxyl groups. The linear polyester resins are prepared with dicarboxylic acids and diols. The main component should be the resins (C) with their glass transition point of 40°–80° C. and acid values of not more than 5. Further those obtained by modifying the linear polyesters by means of graft- or block-polymerization with styrenic, acrylic or aminoacrylic monomers, which have similar glass transition points, softening points and molecular weight characteristics as mentioned above, may be preferably used.

As coloring agents, organic or inorganic pigments and dyes of various types and colors as described below are usable:

Thus those below are available, as black pigments; carbon black, copper oxide, manganese dioxide, aniline black, active carbon, nonmagnetic ferrite, magnetic ferrite and magnetite, and the like, as yellow pigments; chrome yellow, zinc yellow, cadmium yellow, yellow iron oxide, mineral fast yellow, nickel-titanium yellow, naples yellow, naphthol yellow S, hansa yellow S, hansa yellow G, hansa yellow 10G, benzidine yellow G, benzidine yellow GR, quinoline yellow lake, permanent yellow NCG, tartrazine lake, and the like, as orange pigments; red chrome yellow, molybdenum orange, permanent orange GTR, pyrazolone orange, vulcan orange, indanthrene brilliant orange RK, benzidine orange G, indanthrene brilliant orange GK, and the like, as red pigments; red oxide, cadmium red, minium, mercury sulfide, cadmium, permanent red 4R, lithol red, pyrazolone red, watching red, calcium salt, lake red C, lake red D, brilliant carmine 6B, eosine lake, rhodamine lake B, alizarin lake, brilliant carmine 3B, and the like, as violet pigments; manganese violet, fast violet B, methyl violet lake, and the like, as blue pigments; prussian blue, cobalt blue, alkali blue lake, victoria blue lake, phthalocyanine blue, metal-free phthalocyanine blue, partially chlorinated phthalocyanine blue, fast sky blue, indanthrene blue BC, and the like, as green pigments; chrome green, chrome oxide, pigment green B, malachite green lake, final yellow green G, and the like, as white pigments; zinc white, titanium oxide, antimony white, zinc sulfide, and the like, as extender pigments; powdery barytes, barium carbonate, clay, silica, white carbon, talc, alumina white, and the like.

There are available as various dyes such as basic, acidic, and dispersion-type and direct dyes, for example nigrosine, methylene blue, rose bengal, quinoline yellow, ultramarine blue, and the like.

The above-mentioned coloring agents may be used singly or in combination of a plurality of them. Usually, use of 1–20 parts by weight, more preferably 2–10 parts by weight of them on the basis of 100 parts by weight of the binding resin is desirable. If the usage is larger than 20 parts by weight, the toner's fixability will degrade; on the other hand, if smaller than 1 part by weight, desired image density can not be achieved.

For use as transmittable color toners, the undermentioned pigments and dyes of various types and colors are usable as coloring agents:

Usable yellow pigments include C.I.10316 (naphthol yellow S), C.I.11710 (Hansa yellow 10G), C.I.11660 (Hansa yellow 5G), C.I.11670 (Hansa yellow 3G), C.I.11680

(Hansa yellow G), C.I.11730 (Hansa yellow GR), C.I.11735 (Hansa yellow A), C.I.11740 (Hansa yellow RN), C.I.12710 (Hansa yellow R), C.I.12720 (pigment yellow L), C.I.21090 (benzidine yellow), C.I.21095 (benzidine yellow G), C.I.21100 (benzidine yellow GR), C.I.20040 (permanent Yellow NCG), C.I.21220 (vulcan fast yellow 5), C.I.21135 (vulcan fast yellow R), and the like.

As red pigments, usable are C.I.12055 (sterling I), C.I.12075 (permanent orange), C.I.12175 (lithol fast orange 3GL), C.I.12305 (permanent orange GTR), C.I.11725 (Hansa yellow 3R), C.I.21165 (vulcan fast orange GG), C.I.21110 (benzidine orange G), C.I.12120 (permanent red 4R), C.I.1270 (para red), C.I.12085 (fire red), C.I.12315 (brilliant fast scarlet), C.I.12310 (permanent red F2R), C.I.12335 (permanent red F4R), C.I.12440 (permanent red FRL), C.I.12460 (permanent red FRLL), C.I.12420 (permanent red F4RH), C.I.12450 (light fast red toner B), C.I.12490 (permanent carmine FB), C.I.15850 (brilliant carmine 6B), and the like.

Besides, blue pigments usable include C.I.74100 (metal-free phthalocyanine blue), C.I.74160 (phthalocyanine blue), C.I.74180 (fast sky blue), and the like.

These coloring agents may be used singly or in combination of a plurality of them, but their use of 1–10 parts by weight, more preferably 2–5 parts by weight on the basis of 100 parts by weight of the binding resin in the toner particles is desirable. If their amount used is larger than 10 parts by weight, the toner's fixability and transmittance will be low; on the other hand, if smaller than 1 part by weight, the desired image density may not be achieved.

Offset-preventive agents preferably usable are various waxes, particularly, low molecular weight polypropylene, polyethylene, or polyolefinic waxes such as oxidized polypropylene and polyethylene. Further, as such waxes, those with their number average molecular weight (Mn) of 1,000–20,000 and softening point (Tm) of 80°–150° C. are preferable. If the number average molecular weight Mn is lower than 1000 or the softening point Tm is lower than 80° C., these waxes will fail to make uniform dispersion with the binding resin in the toner and the wax only may separate out on the toner surfaces. Then undesirable results might be brought about, while the toner is kept in store or being in use for development. Further a photosensitive member may be filmed with resin. On the other hand, if the number average molecular weight Mn exceeds 20,000 or the softening point Tmis over 150° C., not only its compatibility with the binding resin will be low, but the effect of wax inclusion like high temperature offset resistance and the like can not be achieved. From the standpoint of compatibility, waxes having polar groups are desirable, when used together with binding resins having polar groups.

Useful as charge controlling agents, there may be mentioned positive charge controlling agents, e.g., azine compounds Nigrosine base EX, Bontron N-01, 02, 04, 05, 07, 09, 10, and 13 (made by Orient Kagaku Kogyo K.K.), oil black (made by Chuo Gosei Kagaku K.K.), Quaternary Ammonium Salt P-51, polyamine compound P-52, Sudan Schwaltz BB (Solvent Black 3: C.I.No. 26150), Fett Schwaltz HBN (C.I.No. 26150), Brilliant Spirit Schwaltz TN (made by Farbenfabriken Bayer K.K.) and further, alkoxylated amines, alkyl amides, molybdate chelate pigments and imidazole compounds, etc.; Negative charge controlling agents, e.g. azo dyes of chrome complex salt type S-32, 33, 34, 35, 37, 38, 40 (made by Orient Kagaku Kogyo K.K.), Eisenspilon Black TRH, BHH (made by Hodogaya Kagaku K.K.) and Kayaset Black T-22, 004 (made by Nihonkayaku K.K.); Copper phthalocyanine dyes S-39 (made by Orient Kagaku Kogyo K.K.), chrome complex salt E-81 and -82 (made by orient Kagaku Kogyo K.K.), zinc complex salt E-84 (made by Orient Kagaku Kogyo K.K.), and aluminum complex salt E-86 (Orient Kagaku Kogyo K.K.), and the like.

While the amount of the charge controlling agent to be added should be appropriately selected, depending on the type of toner, types of toner additives, binding resins and the like. In the case where the agent is to be contained in the toner by suspension method or the like, the amount should be 0.1–20 parts by weight, preferably 1–10 parts by weight, on the basis of 100 parts by weight of the toner-composing resin. If it is less than 0.1 part by weight, the desired charging amount can not be obtained. If it is more than 20 parts by weight, the charging amount will become unstable and the toner's fixability will decline.

On the other hand, when the charge controlling agent is stuck and securely fixed on the toner surfaces, its amount used should be 0.001–10 parts by weight, preferably 0.05–2 parts by weight, and still preferably 0.1–1 part by weight, on the basis of 100 parts by weight of the toner particles. If its amount is less than 0.001 part by weight, the charging amount will be lacking because of a small amount of charge controlling agent existing on the toner particle surface, but if more than 10 parts by weight, the sticking of the charge controlling agent onto the toner surfaces is inadequate, and the charge controlling agent may separate from the toner surfaces while in use.

There may be mentioned as the organic solvent for dissolving/dispersing toner compositions containing at least thermoplastic resins, dichloromethane, dichloroethane, trichloromethane, trichloroethane, methyl acetate, ethyl acetate, propyl acetate, methyl formate, ethyl formate, propyl formate, butyl formate, methyl propionate, ethyl propionate, diethyl ether, dipropyl ether, benzene, toluene, xylene, acetone, methyl ethyl ketone, cyclohexanone, tetrahydrofuran, and the like. They may be used singly or in mixture.

The thermoplastic resin is dissolved/dispersed into an organic solvent so as to have a viscosity of less than 100 cp at a temperature of 15–25° C., preferably 1–50 cp, or more preferably 3–30 cp. If the viscosity is higher than 100 cp, the critical pressure becomes too high when the solution or dispersion is passed through the microporous body, tending to cause clogging. If too low, the productivity at the drying stage after formation of the emulsion is low. Recohesion of mutual particles tends to occur at the drying time. Even when thermoplastic resins containing additives are used, it is proper only to select their amounts so that the toner composition-dispersed phase should fall in the aforementioned viscosity range.

Some dispersant is added to the aqueous solution which is to be passed through the microporous body and form the continuous phase.

Available as such dispersants are water soluble polymers such as polyvinyl alcohol, starch, methyl cellulose, carboxy methyl cellulose, hydroxy ethyl cellulose, sodium polyacrylate, and sodium polymethacrylate; and surface active agents such as anionic surface active agents, cationic surface active agents, ampholytic surface active agents, and nonionic surface active agents; besides, usable are barium sulfate, calcium sulfate, barium carbonate, magnesium carbonate, calcium phosphate, various metal oxides, and the like.

As anionic surface active agents, there are available salts of fatty acids such as sodium oleate and potassium salt of castor oil; alkyl sulfates such as sodium lauryl sulfate and ammonium lauryl sulfate; alkyl benzene sulfonates such as sodium dodecyl benzene sulfonate; alkyl naphthalene sulfonates, dialkyl sulfosuccinates, alkyl phosphates, naphthalene succinate-formalin condensate, and polyoxyethylene alkyl sulfate, and the like.

Nonionic surface active agents available include polyoxyethylene alkyl ether, polyoxyethylene alkyl phenol ether, polyoxyethylene fatty acid ester, sorbitan fatty acid esters, polyoxysorbitan fatty acid esters, polyoxyethylene alkyl amines, glycerine fatty acid esters, oxyethylene-oxypropylene block polymer, and the like.

Available as cationic surface active agents are alkyl amine esters such as lauryl amine acetate and stearyl amine acetate; and quaternary ammonium salts such as lauryl trimethyl ammonium chloride, and the like.

Usable as ampholytic surface active agents are lauryl dimethyl amine oxide and the like.

These dispersants are usable singly or in combination.

The amount of the dispersant to be added should be 0.01–10% by weight to solid matters, preferably 0.1–5% by weight.

The dispersion of a toner composition comprising at least a thermoplastic resin which is dissolved or dispersed into an organic solvent is pressed and passed through a microporous body into the liquid which is to form a continuous phase to be granulated. A pressure in excess of a minimum pressure Pc (critical pressure [KPa]) represented by the following formula [I] needs to be applied to the dispersed phase:

$$Pc = 2r \cos \theta / R \qquad [I]$$

Where r denotes critical tension or interfacial tension (dyn/cm) between oil and water (dispersed phase and continuous phase); $\theta$, contact angle or contact angle (deg) of oil (dispersed phase) with water surface (continuous phase); and R, membrane's mean pore radius ($\mu$m), the membrane designating the microporous body which meets the above-described conditions. On this account, while the pressure P is lower than Pc, the dispersed phase will not pass through the pores, but only when it exceeds Pc, the dispersed phase can flow through the pores, so that the liquid droplets are dispersed into the continuous phase. Thus Pc is the lowest pressure at which the permeating flux of the dispersed phase is observable, which is called critical pressure. It should be noted that the formula [I] implies that the smaller the pore diameter of the body, the higher pressure is required and that the critical pressure may be lowered by reducing the surface tension.

The higher the pressure, the higher productivity may be attained, but if the pressure is too high, variation in the particle size is large. Accordingly, the pressure at the time of pressing the dispersed phase should preferably be set normally at 1–10 times the minimum pressure represented by the aforementioned formula [I], depending on the type of the dispersed phase and the type of the continuous phase and its concentration. At this time, it is desirable to set the conditions so that the diameter of the obtained particles may have 2–5 times as large as the pore diameter of the microporous body.

When forming an emulsion so as to contain a component (dispersion component) which does not dissolve in the organic solvent used as an emulsion component, it is a sine qua non that the dispersion component in the dispersion has particle sizes adequately smaller than the mean pore diameter (2R) of the microporous body. The adequately small dispersed particle size should be less than ⅓ the mean pore diameter of the microporous body, preferably smaller than ⅕, or further preferably less than ⅒. If it is larger than ⅓, the dispersed particles cause clogging of the microporous body at the formation time of the emulsion, making its efficient production impossible. On this account, the dispersed particles should desirably be used only after turning them into fine particles by comminuting them beforehand.

Finally, resin particles are obtained by removing the organic solvent from the emulsion, then the resin particles are separated from the aqueous solution, and the dispersion stabilizers and others sticking on their surfaces are washed off, followed by drying, giving the toner particles.

The removal of the organic solvent can be made by heating the emulsion and solution to a temperature higher than the boiling point of the organic solvent which composes the emulsion. This may be performed by spraying the emulsion by a spray drier or the like into an atmosphere at a temperature higher than the boiling point of the organic solvent.

The resultant resin particles have a coefficient of fluctuation of 15 or less, preferably 13 or less, more preferably 10 or less. When the coefficient is larger than 15, the charge amount distribution of toner become broad, thereby scattering toner and fogs occur under copying operation.

The coefficient of fluctuation represents the scale (%) of variation in particle size, being standard deviation ($\sigma$) in particle size divided by mean particle size. It was determined as follows:

First, a photograph is taken by a scanning type electron microscope. One hundred particles are randomly chosen, to measure these particle sizes. Based on the measurement results, the standard deviation ($\sigma$) and the mean particle size are determined. It should be noted that the standard deviation ($\sigma$) used in the present invention is represented by the square root of the differences of the respective diameters of n particles from the average values, which are squared and divided by (n−1). Thus it is represented by the following formula:

$$\sigma = \sqrt{\frac{(X_1 - X_m)^2 + (X_2 - X_m)^2 + \ldots + (X_n - X_m)^2}{n-1}}$$

$$= \sqrt{\frac{1}{n-1}\left[\Sigma X_i^2 - \frac{(\Sigma X_i)^2}{n}\right]}$$

Where $X_1, X_2, \ldots, X_n$ are measured values of particle sizes of the sample particles, and $X_m$ the mean value of the respective n measured values. The coefficient of the fluctuation is then given by dividing the standard deviation ($\sigma$) obtained in this way by the mean particle size ($X_m$) and multiplying this quotient by 100.

Coefficient of fluctuation =

$$\frac{\sqrt{\frac{1}{n-1}\left[\Sigma X_i^2 - \frac{(\Sigma X_i)^2}{n}\right]}}{X_m} \times 100$$

The toner additives for example, fluidizing agent or charge controlling agent, may be dissolved or dispersed into the dispersion phase at the time of forming an emulsion or may be added at the stage when the emulsion has been formed. For example, a dispersion containing those additives dispersed into methanol, water, or the like is added to the emulsion. In this instance, when the organic solvent is removed from the emulsion, particle cohesion takes place, but the aggregates may be readily pulverized after drying, to give a toner with small particle sizes distributed sharply.

The additives for toner, for example, coloring agent, charge controlling agent or fluidizer may be stuck and fixed on the resin particles after the resin particles are obtained from the emulsion.

Further, to the toner of the present invention, may be added nonmagnetic inorganic fine particles for the sake of charging control, fluidity, blocking resistance and higher efficiency at the time of its production. Such agents used include various nonmagnetic inorganic fine particles of various carbides, such as silicon, boron, titanium, zirconium, hafnium, vanadium, tantalum, niobium, tungsten, chromium, molybdenum and calcium carbides, and diamond carborundum; various nitrides such as boron, titanium and zirconium nitrides; borides such as zirconium boride; various oxides such as iron, chrome, titanium, calcium, magnesium, zinc, copper and aluminum oxides and silica, colloidal silica and hydrophobic silica; sulfides such as molybdenum disulfide; fluorides such as magnesium and carbon fluorides; various metal soaps such as aluminum, calcium, zinc and magnesium stearates; talc and bentonite, and the like. These fine particles should desirably be used after treated to be hydrophobic. Such fine particles may be dissolved or dispersed into the dispersed phase, when the emulsion is formed, or added after the emulsion has been formed, or they may be stuck and fixed on the surfaces of the toner particles formed after drying.

Furthermore, for improvement in the fluidity, cleaning property, and the like, organic fine particles may be stuck and fixed; for example, various organic fine particles of polystyrenes, poly((meth)acrylic acids), poly((meth(acrylates), benzoguanamines, melamines, teflons, silicones, polyethylenes, polypropylenes and the like, granulated by a wet polymerization method such as the emulsion polymerization, soap-free emulsion polymerization or nonaqueous dispersion method, or a vapor phase method may be used. Such particles may be dispersed in the dispersed phase, when the emulsions formed, or added after the emulsion has been formed, or they may be stuck and fixed on the surfaces of the resin particles formed after drying.

The toners obtained as above described are applied to two-component developers together with carriers.

As the carriers, those conventionally used in use such as iron and ferrite carriers, coating carriers, binder type carriers, and the like may be used.

Actually, there may be mentioned as the iron and ferrite carrier materials, alloys and mixtures of such metals as iron, nickel, and cobalt, with such metals as zinc, antimony, aluminum, lead, tin, bismuth, beryllium, manganese, selenium, tungsten, zirconium, and vanadium; their mixtures with such metal oxides as titanium and magnesium oxides, such nitrides as chromium and vanadium nitrides, and such carbides as silicon and tungsten carbides; and ferromagnetic ferrite as well as their mixtures and the like.

Used as coating carriers are the aforementioned iron and ferrite carriers as the core materials coated with various synthetic resins or ceramic layers. Synthetic resins used include, for example, various thermoplastic and thermosetting resins such as polystyrenes, poly(meth)acrylic resins, polyolefins, polyamides, polycarbonates, polyethers, polymers containing sulfonic acid, polyesters, epoxy resins, polybutyrals, urea resins, urethane/urea resins, silicones, polyethylenes and teflons and their mixtures as well as copolymers, block polymers, graft polymers and polymer blends of these resins. Further, for improvement in chargeability, various resins having various types of polar groups may be used. Ceramic coatings are formed of various ceramic materials coated by flame coating process, various plasma process or sol-gel process, and the like Further, for improving the chargeability and other various developer characteristics, the carrier may be coated with various organic and/or inorganic materials which are dispersed and/or dissolved. Coating carriers coated with these materials fixed on the surfaces thereof may be also used. Furthermore, the coating carrier coated with polyethylene by the surface polymerization method described in Japanese Patent Laid-Open Publication Nos. Hei 2-187770 and -187771 may be advantageously used.

As the apparatus for making the carrier coating and the fixation treatment of various materials, use is made of various coating equipments such as a spray drier and tumbling flow tank, and various surface modifying equipments mentioned above.

Used as the binder type carriers are those using various magnetic materials and various synthetic resins used for the coating layer as the binding resins, with various organic and/or inorganic materials added, if necessary. These materials are subjected to mixing-kneading-grinding as required, to have the particle size adjusted to the required value.

The mean particle size of the carrier typically used is 20–200 μm, preferably 30–100 μm, but it may be appropriately set, according to the development system and the like. In general, if the particle size is smaller than 20 μm, the carrier itself will be developed, but if it is larger than 200 μm, the image texture will be rough. In the following, the present invention is described in connection with its preferred embodiments.

Example 1 (Toner a)

| Component | Parts by weight |
|---|---|
| Polyester resin<br>(Mn: 3400, Mw/Mn: 62.8, Acid value: 16.7,<br>Softening point: 109° C., and Tg: 64° C.) | 100 |
| Carbon black<br>(made by Mitsubishi Kasei K.K., MA#8;<br>primary particle size: 24 μm) | 10 |
| Oxidized low molecular weight<br>polypropylene (made by Sanyo Kasei Kogyo<br>K.K., Viscol TS-200 550P) | 5 |

The above-listed materials, after well mixed in a ball mill, were kneaded on three rolls heated to 140° C. After the kneaded mixture was cooled by leaving intact, it was roughly ground, using a feather mill. Then 100 parts by weight of the roughly ground mixture was dissolved/dispersed in 400 parts by weight of a mixed solvent of methylene chloride/toluene (8/2), to give a homogeneous mixed dispersion (dispersion phase 2) (viscosity 10.5 cp at 20° C.). Next, prepared was an aqueous solution (continuous phase 3) having as dispersion stabilizers 60 g of 4% methyl cellulose (Methocell K35LV, made by Dow Chemical Co.), 5 g of 1% solution of sodium dioctyl sulfosuccinate (Nikkol OTP75, made by Nikko Chemical K.K.) and 0.5 g of sodium hexamethaphosphate (made by Wako Junyaku K.K.) dissolved in 1000 g of deionized water. Using a porous glass (hydrophilic) formed of silicate-alumina in boric acid, with $\epsilon=\phi10/\phi90:1.2$ and a pore diameter of 2.0 μm, the dispersed phase 2 was pressured into the continuous phase 3 by use of the equipment of the type shown in FIG. 3, thereby preparing an emulsion (the pressure at this time was three times as high as the critical pressure).

Thus the dispersed phase 2 is continuously pressed into the microporous body 6 from a tank 4 by means of a pump P, to be mixed with the continuous phase continuously fed by means of another pump P from a tank 5 into the inside of the microporous body 6, thereby giving an emulsion. The emulsion formed in this way is transported to an emulsion tank 7.

Thereafter, the emulsion inside the emulsion tank was taken out and the mixed solvent of methylene chloride/toluene was removed, while this emulsion was stirred in a stirring tank with the temperature of the system held at 50° C. Further, the dispersion stabilizers and the like, sticking on the surfaces, were taken away by repeating washing and filtration, followed by drying, to give colored particles A with a mean particle size of 6 μm. Furthermore, the compound represented by the following chemical formula:

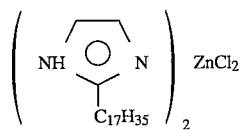

of 1.0 part by weight on the basis of 100 parts by weight of the colored particles A was put in a Henschel mixer together therewith, to be mixed and stirred at 1,500 rpm for 2 min, thereby getting it stick on the surfaces of the colored particles A. Thereafter, the particles were subjected to a treatment at 6,000 rpm for 3 min, using a hybridization system NHS-1 (made by Nara Kikai Seisakusho K.K.) to give a toner A with a mean particle size of 6 μm. Then 0.2 parts by weight of hydrophobic silica R-974 (mean particle size 17 mμ, made by Nihon Aerosil K.K.) was mixed with 100 parts by weight of the toner A in a Henschel mixer. The mixture was stirred at 1,500 rpm for 1 minute to give toner a.

Example 2 (Toner b)

| Component | Parts by weight |
| --- | --- |
| Polyester resin (Tafton NE-382, made by Kao K.K.) | 100 |
| Brilliant Carmine 6B (C.I. 15850) (Preground product 0.1 μm) | 3 |
| Zinc metal complex (E-84, made by Orient Kagaku Kogyo K.K.) (Preground product 0.4 μm) | 5 |

Roughly ground mixture of 100 parts by weight obtained similarly as in Example 1 was dissolved/dispersed into 400 parts by weight of a mixed solvent of methylene chloride/toluene (8/2), giving a homogeneously mixed dispersion (dispersed phase 2) (viscosity:10.1 cp at 20° C.). Next, an aqueous solution (continuous phase 3) having as dispersion stabilizers 60 g of 4% solution of methyl cellulose (Methocell K35LV, made by Dow Chemical Co.), 5 g of 1% solution of sodium dioctyl sulfosuccinate (Nikkol OTP75, made by Nikko Chemical K.K.) and 0.5 g of sodium hexamethaphosphate (made by Wako Junyaku K.K.) dissolved in 1000 g of deionized water was prepared. Using a porous glass (hydrophilic) formed of a system of silicate-alumina in boric acid, with $\epsilon = \phi 10/\phi 90 : 1.2$ and a pore diameter of 2.0 μm, an emulsion was prepared by pressuring the dispersed phase 2 into the aforementioned continuous phase 3 by use of the equipment of the type shown in FIG. 3 (the pressure at this time was three times as high as the critical pressure). Thereafter, the mixed solvent of methylene chloride/toluene was removed, while this emulsion was stirred in a stirring tank with the temperature of the system held at 50° C. Further, after taking away the dispersion stabilizers and the like sticking on the surfaces of the particles by repeating washing and filtration, followed by drying, to give toner B with a mean particle size of 5.5 μm. Hydrophobic silica R-974 (mean particle size 17 mμ, made by Nihon Aerosil K.K.) of 0.5 parts by weight was mixed with 100 parts by weight of this toner B in Henschel mixer and stirred at 1,500 rpm for 1 min, to give toner b.

Example 3 (Toner c)

In the similar method as in Example 1, an emulsion was prepared. Zinc metal complex (E-84, made by Orient Kagaku Kogyo K.K.) was ground separately beforehand in an aqueous medium, using a sand mill (a paint conditioner, made by Red Devil Co.). Three parts by weight of the zinc metal complex (E-84; 0.4 μm, made by Orient Kagaku Kogyo K.K.) thus obtained and 0.5 part by weight of hydrophobic silica (R974; 17 mμ, made by Nihon Aerosil K.K.) dispersed in methanol were added to the aforementioned emulsion on the basis of 100 parts by weight of the solid content of toner therein. The mixture was then heated to 80° C., while stirring in a stirring tank, thereby making soft cohesion of mutual particles, producing aggregates of 50 μm–1 mm. The aggregates were washed and dried to give toner aggregates with particle size of 100 μm– 2 mm. By grinding this toner aggregates with a mechanical mill (Criptron, made by Kawasaki Jukogyo K.K.), to give toner C with a mean particle size of 6 μm. Then 0.2 parts by weight of hydrophobic silica R-974 (mean particle size 17 mμ, made by Nihon Aerosil K.K.) was mixed with 100 parts by weight of toner C in Henschel mixer and stirred at 1,500 rpm for 1 min, to give toner c.

Comparative Example 1 (Toner d)

Using the similar dispersed phase and continuous phase as in the emulsion-granulating method of Example 1, but without using the microporous body, the aforementioned homogeneous dispersion was suspended in water by use of a TK Autohomomixer (made by Tokushu Kika kogyo K.K.) with the number of revolution so adjusted as to have a mean particle size of 3–10 μm, thereby making granulation, otherwise being similar as in Example 1, giving toner d with a mean particle size of 6 μm.

Comparative Example 2 (Toner e)

Using the similar dispersed phase and continuous phase as in the emulsion-granulating method of Example 2, but without using the microporous body, the aforementioned homogeneous dispersion was suspended in water by use of a TK Autohomomixer (made by Tokushu Kika Kogyo K.K.), with the number of revolution so adjusted as to have a mean particle size of 3–10 μm, thereby making granulation, otherwise being similar as in Example 2, giving toner e with a mean particle size of 6 μm.

Example 4 (Toner f)

By the similar method, except that a polyester resin (Tafton NE-382, made by Kao K.K.) only was used as the component, when forming the emulsion in Example 2, an emulsion with a viscosity of 9.8 cp (20° C.) was prepared. Thereafter, using the similar method as in Example 2, resin particles f with a mean particle size of 5.1 μm were obtained.

Three parts by weight of Brilliant Carmine 6B (C.I.15850) were mixed with 100 parts by weight of the resin particles in Henschel mixer. The mixture was stirred at 1,500 rpm for 2 min, thereby getting the Brilliant Carmine 6B stick onto the surfaces of the resin particles f by van der Waal's force and electrostatic force. Next, by subjecting these particles to a treatment at 7,200 rpm for 3 min by means of Hybridization System NHS-1 (made by Nara Kikai Seisakusho K.K.), brilliant carmine 6B was fixed on the resin particles f. Further, 15 parts by weight of MMA/iBMA (1/9) polymer fine particles MP-4951 (mean particle size: 0.2 μm and glass transition point: 85° C., made by Soken Kagaku K.K.), 0.5 parts by weight of zinc metal complex (E-84, made by Orient Kagaku Kogyo K.K.) and 0.2 parts by weight of titanium oxide (T-805, made by Nihon Aerosil K.K.) were mixed with 100 parts by weight of the fine resin particles obtained above. The mixture was stirred at 1,500 rpm for 2 min, thereby getting fine particles of zinc metal complex and titanium oxide stick onto the surfaces of the resin particles by van der Waal's force and electrostatic force. Then by subjecting the particles to a treatment at 7,200 rpm for 3 min, using a Nara Kikai Seisakusho's Hybridization System NHS-1, toner F with a mean particle size of 5.5 μm was obtained. Then 0.2 parts by weight of hydrophobic silica R-974 (mean particle size: 17 μm, made by Nihon Aerosil K.K.) was mixed with 100 parts by weight of toner F in Henschel mixer. The obtained mixture was stirred at 1,500 rpm for 1 min to give toner f.

Example 5

Figure 3:
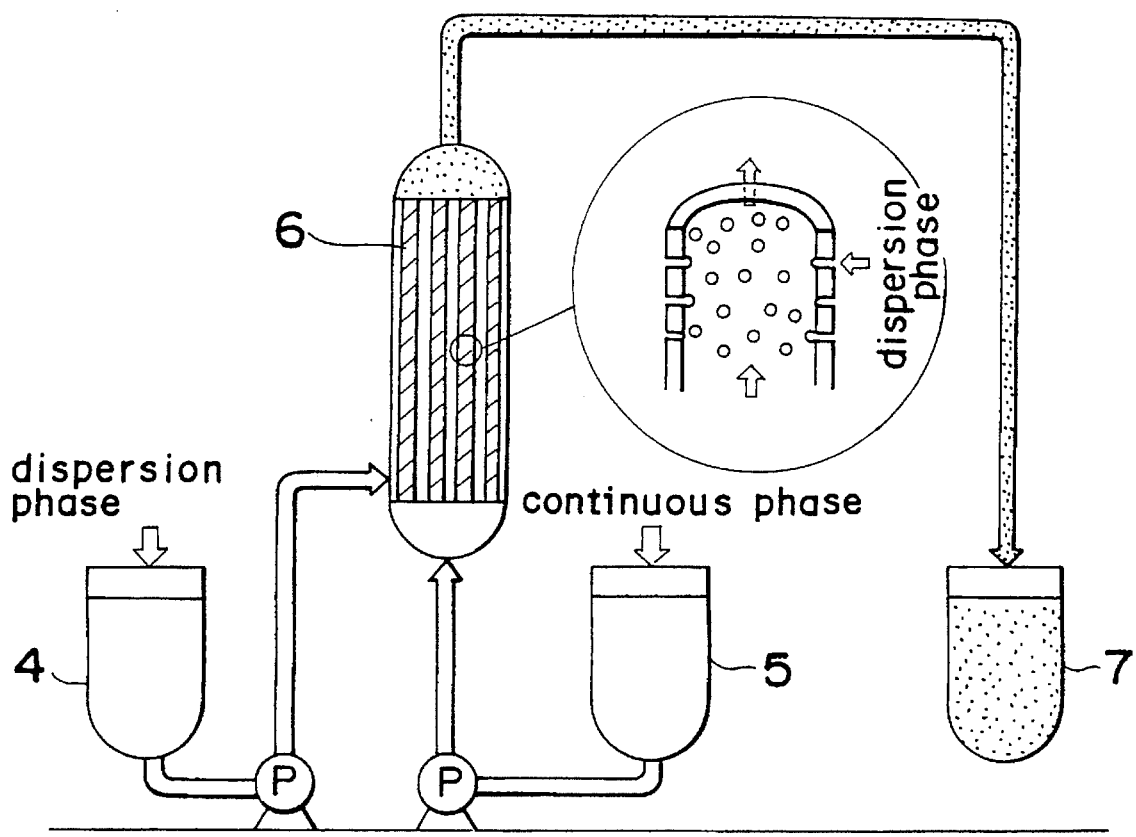
FIG. 3 is a schematic flow diagram for a toner-manufacturing system using the microporous body.
Figure 4:
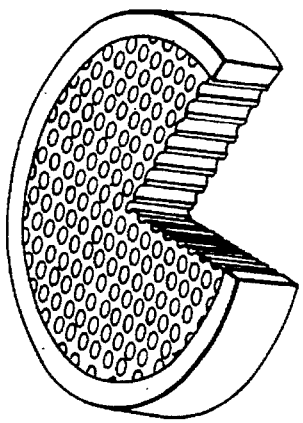
FIG. 4 is a schematic fragmentary sectional view of capillary plate.

An emulsion was prepared by pressing the dispersed phase with a system shown in FIG. 3 remodeled, using a porous glass (capillary plate: outside diameter: 25 mm, effective diameter: 20 mm, pore diameter: 2.0 μm, thickness: 1.0 mm, $\epsilon=\phi 10/\phi 90:1.1$, hydrophilic), composed as shown in FIG. 4, as the apparatus for preparing the emulsion in Example 2. Thereafter, through the similar treatment as performed in Example 2, toner g with a mean particle size of 6.2 μm was obtained.

Manufacture of Carrier

To take an assessment later described of the obtained toners, a binder type carrier was manufactured as follows:

| Component | Part by weight |
|---|---|
| Polyester resin (NE-1110; made by Kao K.K.) | 100 |
| Inorganic magnetic powder (MFP-2; made by TDK K.K.) | 500 |
| Carbon black (MA#8; made by Mitsubishi Kasei K.K.) | 2 |

The aforementioned materials were thoroughly mixed and pulverized in Henschel mixer and, then, melted and kneaded, using an extruding kneader held at 180° C. at its cylinder part and at 170° C. at its cylinder head part. The kneaded matter was cooled and roughly pulverized and then finely pulverized in a jet mill. The obtained particles were classified by an air-classifier to give a magnetic carrier with a mean particle size of 55 μm.

Evaluation

Carrier Particle Size

The carrier particle size was measured, using Microtrack Model 7995-10SRA (made by Nikkiso K.K.), and its mean particle size was determined.

Methods of Evaluation of Various Physical Properties Charging Rate (Q/M) and Scattering Rate Two grams of the toner subjected to the surface treatments and 28 g of the aforementioned carrier were put in a 50 cc polybottle and this bottle is mounted on a turntable and rotated at 1,200 rpm for 10 minutes in order to examine charging rate of a toner. The scattering amounts were measured at the same time.

The scattering amount was measured by means of a digital dust counter, type P5H2 (made by Shibata Kagaku K.K.). With the dust counter and a magnet roll installed 10 cm apart from each other and 2 g of a developer set on this magnet roll, the number of toner particles scattered as dust was read by the aforementioned dust counter and indicated by count per minute (cpm) when the magnet was revolved at 2,000 rpm. The evaluation was made in 3 stages with the scattering rate less than 300 cpm indicated by o, less than 500 cpm by Δ, and more than 500 cpm by ×. In practical applications, those ranked equal to or higher than Δ are usable, but those ranked to o are desirable. The measured results of the charging rate and the scattering amount are summarized in Table 1.

Image Evaluation

Two-component developers were prepared by mixing the toners shown in Table 1 and the carrier at a proportion of toner/carrier=5/95. With these developers, image evaluation on items given in Table 1 was performed, using EP-408Z (made by Minolta Camera K.K.) in Example 1 and Comparative Example 1 and EP-570Z (made by Minolta Camera K.K.) in Example 3. In examples 2 and 4 and Comparative Example 2, use was made of a fixer of EP-570Z (made by Minolta Camera K.K.) remodeled to an oil-coated system.

(1) Fogging on Image

Copy images were formed using the copying machine in the combinations of various toners and the carrier. The fogging on the copy image was ranked by evaluating the toner-fogs on white paper. The developer is practically usable, if it was ranked equal to or higher than Δ, but it should desirably be higher than o.

(2) Light-Transmittance

In Examples 2 and 4 and Comparative Example 2, light-transmittance was also tested. The light-transmittance was visually evaluated by the brilliancy of color in the projected image when a fixed image on an OHP sheet was projected by an OHP projector. The results are given in Table 1. The mark o in this table means the transmittance falls in practically usable range in color reproducibility.

Coefficient of Fluctuation

The coefficient of fluctuation was measured as described aforementioned.

TABLE 1

| | Toner | Coef. of fluc. of toner* | Charging rate (μC/g) | Scattering rate | Fogs | Transmittance |
|---|---|---|---|---|---|---|
| Exam. 1 | a | 8 | +18 | o | o | — |
| Exam. 2 | b | 7 | −20 | o | o | o |
| Exam. 3 | c | 10 | −21 | o | o | — |

TABLE 1-continued

| Toner | | Coef. of fluc. of toner* | Charging rate (μC/g) | Scattering rate | Fogs | Transmittance |
|---|---|---|---|---|---|---|
| Comp. Exam. 1 | d | 36 | +8 | x | x | — |
| Comp. Exam. 2 | e | 38 | −13 | Δ | Δ | ○ |
| Exam. 4 | f | 12 | −18 | ○ | ○ | ○ |
| Exam. 5 | g | 8 | −18 | ○ | ○ | ○ |

*Coef. of fluc. of toner = Coefficient of fluctuation of toner (%)

What is claimed is:

1. A production method of a toner for developing an electrostatic latent image formed on an electrostatic latent image-retaining member comprising:

a first step of passing a toner composition-dispersed phase comprising a thermoplastic resin dissolved or dispersed in an organic solvent through a microporous body to form a homogeneous emulsion in a continuous phase of an aqueous solution, said microporous body having penetrated pores with an uniformity in the pore diameter distribution; a mechanical strength sufficient to resist deformation by the passed dispersed phase; a chemical inertness to the dispersed phase, the continuous phase and toner composition; and a higher wettability to the liquid of the continuous phase than the liquid of the dispersed phase;

a second step of removing the organic solvent from the toner composition-dispersed phase and obtaining toner particles dispersed in the aqueous solution; and a third step of removing the aqueous solution and obtaining toner particles.

2. A production method as claimed in claim 1, wherein the microporous body is a porous glass.

3. A production method as claimed in claim 1, wherein the microporous body has a hydrophilic surface.

4. A production method as claimed in claim 1, wherein the thermoplastic resin is a homopolymer or copolymer synthesized from styrenic monomers, (meth)acrylic monomers or (meth)acrylate monomers, or a polyester resin.

5. A production method as claimed in claim 4, wherein the number average molecular weight (Mn) of the thermoplastic resin falls in a range of $1000 \leq Mn \leq 15000$ and its weight average molecular weight (Mw) and number average molecular weight (Mn) meet a relationship of $20 \leq Mw/Mn \leq 70$.

6. A production method as claimed in claim 1, wherein the thermoplastic resin contains gelling components at a content of 5–20% by weight and has a glass transition point of 55°–80° C., the gelling components having a softening point of 80°–150° C.

7. A production method as claimed in claim 1, wherein the thermoplastic resin is a linear polyester resin having a glass transition point of 55°–70° C., a softening point of 80°–150° C. and a number average molecular weight (Mn) of 2000–15000, its weight average molecular weight (Mw) and the number average molecular weight (Mn) meeting a relationship of $Mw/Mn \leq 3$.

8. A production method as claimed in claim 1, in which the toner composition contains a coloring agent and a charge controlling agent.

9. A production method as claimed in claim 1, in which the toner composition contains a polyolefinic wax having a number of average molecular weight (Mn) of 1000–20000 and a softening point of 80°–150° C.

10. a production method of a toner for developing an electrostatic latent image formed on an electrostatic latent image-retaining member comprising:

a first step of forming a homogeneous emulsion of a toner composition-dispersed phase in a continuous phase of an aqueous solution, said toner composition-dispersed phase comprising a thermoplastic resin dissolved or dispersed in an organic solvent;

a second step of removing the organic solvent form the toner composition-dispersed phase and obtaining toner particles dispersed in the aqueous solution, and a third step of removing the aqueous solution and obtaining toner particles having a 15% or lower coefficient of fluctuation of toner particles; said coefficient of fluctuation defined as:

coefficient of fluctuation=$(\sigma/Xm) \times 100$ wherein a standard deviation ($\sigma$) is represented by the following formula:

$$\sigma = \sqrt{\frac{(X_1 - X_m)^2 + (X_2 - X_m)^2 + \ldots + (X_n - X_m)^2}{n-1}}$$

wherein $X_1, X_2 \ldots X_n$ represent measured values of particle diameters of the sample particles, and $X_m$ represents the mean value of the respective n measured value, and wherein the first step is passing the toner composition-dispersed phase through a microporous body to form the homogeneous emulsion in the continuous phase, said microporous body having penetrated pores with an uniformity in the pore diameter distribution; a mechanical strength sufficient to resist deformation by the passed dispersed phase; a chemical inertness to the dispersed phase, the continuous phase and toner composition; and a higher wettability to the liquid of the continuous phase than the liquid of the dispersed phase.

11. A production method as claimed in claim 10, wherein the thermoplastic resin is a homopolymer or copolymer synthesized from styrenic monomers, (meth)acrylic monomers or (meth)acrylate base monomers, or a polyester resin.

12. A production method as claimed in claim 11, wherein the thermoplastic resin has a number average molecular weight (Mn) falling in a range of $1000 \leq Mn \leq 15000$ and its weight average molecular weight (Mw) and number average molecular weight (Mn) meet a relationship of $20 \leq Mw/Mn \leq 70$.

13. A production method as claimed in claim 10, wherein the thermoplastic resin contains a gelling component at a content of 5–20% by weight, the gelling components having a glass transition point of 55°–80° C. and a softening point of 80°–150° C.

14. A production method as claimed in claim 10, wherein the thermoplastic resin is a linear polyester resin having a glass transition point of 55°–70° C., a softening point of 80°–150° C. and a number average molecular weight (Mn) of 2000–15000, its weight average molecular weight (Mw) and number average molecular weight (Mn) meeting a relationship of $Mw/Mn \leq 3$.

* * * * *